US009418687B2

(12) United States Patent
Terada et al.

(10) Patent No.: US 9,418,687 B2
(45) Date of Patent: Aug. 16, 2016

(54) SUSPENSION BOARD WITH CIRCUIT

(71) Applicant: NITTO DENKO CORPORATION, Osaka (JP)

(72) Inventors: Naohiro Terada, Osaka (JP); Yoshito Fujimura, Osaka (JP); Hiroyuki Tanabe, Osaka (JP); Saori Kanezaki, Osaka (JP); Yuu Sugimoto, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/936,102

(22) Filed: Nov. 9, 2015

(65) Prior Publication Data
US 2016/0133284 A1    May 12, 2016

(30) Foreign Application Priority Data

Nov. 10, 2014    (JP) .................................. 2014-228316

(51) Int. Cl.
*G11B 5/40* (2006.01)
*G11B 5/48* (2006.01)

(52) U.S. Cl.
CPC .............. *G11B 5/4826* (2013.01); *G11B 5/484* (2013.01); *G11B 5/4853* (2013.01); *G11B 5/486* (2013.01)

(58) Field of Classification Search
None
See application file for complete search history.

(56) References Cited

U.S. PATENT DOCUMENTS

| 6,856,075 | B1 * | 2/2005 | Houk | H01L 41/313 310/348 |
| 8,149,545 | B1 * | 4/2012 | Chai | G11B 5/4873 360/294.3 |
| 8,879,210 | B1 * | 11/2014 | Hahn | G11B 5/4873 360/245.3 |
| 8,947,831 | B1 * | 2/2015 | Ee | G11B 5/483 360/245.3 |
| 2006/0209462 | A1 * | 9/2006 | Kajitani | G11B 5/4826 360/234.6 |
| 2009/0116150 | A1 * | 5/2009 | Ohsawa | G11B 5/486 360/245.9 |
| 2010/0165515 | A1 | 7/2010 | Ando | |
| 2013/0248233 | A1 * | 9/2013 | Kanezaki | H05L 1/18 174/260 |
| 2014/0377973 | A1 * | 12/2014 | Ikeji | H02K 1/00 439/199 |

FOREIGN PATENT DOCUMENTS

JP    2010-154632 A    7/2010

* cited by examiner

*Primary Examiner* — Carlos E Garcia
(74) *Attorney, Agent, or Firm* — Jean C. Edwards, Esq.; Edwards Neils LLC (57) ABSTRACT

A suspension board with circuit includes a slider mounting region configured to mount a slider thereon, a pedestal portion provided in the slider mounting region and configured to support the slider, and a dam portion provided in the slider mounting region and configured to prevent an adhesive fixing the slider from flowing out of the slider mounting region. The thickness of the pedestal portion is thicker than that of the dam portion.

4 Claims, 7 Drawing Sheets

SUSPENSION BOARD WITH CIRCUIT

CROSS-REFERENCE TO RELATED APPLICATION

The present application claims priority from Japanese Patent Application No. 2014-228316 filed on Nov. 10, 2014, the contents of which are hereby incorporated by reference into this application.

BACKGROUND OF THE INVENTION

1. Field of the Invention

The present invention relates to a suspension board with circuit, to be specific, to a suspension board with circuit used in a hard disk drive.

2. Description of Related Art

It has been conventionally known that a suspension board with circuit is mounted with a slider including a magnetic head and is provided in a hard disk drive.

For example, a suspension board with circuit including a connecting surface for connecting a slider thereto and a pedestal that is disposed at the outside of the connecting surface for supporting the slider has been proposed (ref: for example, Japanese Unexamined Patent Publication No. 2010-154632).

In the suspension board with circuit described in Japanese Unexamined Patent Publication No. 2010-154632, the pedestal is formed into a frame shape and includes a lower pedestal prepared from a base insulating layer and an upper pedestal prepared from a conductive layer.

To mount the slider on the suspension board with circuit described in Japanese Unexamined Patent Publication No. 2010-154632, first, an adhesive is disposed in the connecting surface and subsequently, the slider is connected to the connecting surface, while the slider is brought into contact with the pedestal to support the pedestal. Meanwhile, the pedestal restricts the outflow of the adhesive from the connecting surface to the outside of the pedestal.

SUMMARY OF THE INVENTION

The pedestal is brought into contact with the slider, so that it may be damaged. In such a case, there is a disadvantage that the pedestal cannot surely restrict the outflow of the adhesive to the outside of the pedestal.

It is an object of the present invention to provide a suspension board with circuit that is capable of preventing damage of a dam portion and surely supporting a slider, while preventing the outflow of an adhesive and surely fixing the slider to a slider mounting region, by forming a pedestal with a sufficient thickness.

[1] A suspension board with circuit of the present invention includes a slider mounting region where a slider is to be mounted, a pedestal portion provided in the slider mounting region and configured to support the slider, and a dam portion provided in the slider mounting region and configured to prevent an adhesive for fixing the slider from flowing out of the slider mounting region, wherein the thickness of the pedestal portion is thicker than that of the dam portion.

In the suspension board with circuit, the thickness of the pedestal portion is thicker than that of the dam portion. Thus, when the slider is brought into contact with the pedestal portion in the slider mounting region, contact of the slider with the dam portion can be prevented, thereby preventing damage of the dam portion.

Thus, the outflow of the adhesive out of the slider mounting region can be prevented by the dam portion, and the slider can be surely fixed to the slider mounting region by the adhesive.

[2] The present invention includes the suspension board with circuit described in the above-described [1] in which a conductive layer, a first cover insulating layer covering one surface in a thickness direction of the conductive layer, and a second cover insulating layer disposed at one surface in the thickness direction of the first cover insulating layer are included, wherein the pedestal portion includes a pedestal conductive layer included in the conductive layer, a pedestal first cover insulating layer included in the first cover insulating layer and covering one surface in the thickness direction of the pedestal conductive layer, and a pedestal second cover insulating layer included in the second cover insulating layer and disposed at one surface in the thickness direction of the pedestal first cover insulating layer; the dam portion includes a dam conductive layer included in the conductive layer, a dam first cover insulating layer included in the first cover insulating layer and covering one surface in the thickness direction of the dam conductive layer, and a dam second cover insulating layer included in the second cover insulating layer and disposed at one surface in the thickness direction of the dam first cover insulating layer; and the minimum size in a direction orthogonal to the thickness direction of the pedestal conductive layer is larger than that in a direction orthogonal to the thickness direction of the dam conductive layer.

In the suspension board with circuit, the minimum size in the direction orthogonal to the thickness direction of the pedestal conductive layer is larger than that in the direction orthogonal to the thickness direction of the dam conductive layer, so that the thickness of the pedestal first cover insulating layer can be formed to be thicker than that of the dam first cover insulating layer. Thus, the thickness of the pedestal portion can be surely formed to be thicker than that of the dam portion.

[3] The present invention includes the suspension board with circuit described in the above-described [2] in which the conductive layer includes a wire and the minimum size of the dam conductive layer is the same as that in a direction orthogonal to the thickness direction of the wire.

In the suspension board with circuit, the minimum size of the dam conductive layer is the same as that in the direction orthogonal to the thickness direction of the wire. Thus, the thickness of the dam first cover insulating layer covering the dam conductive layer can be surely formed to be thinner than that of the pedestal first cover insulating layer covering the pedestal conductive layer. Thus, contact of the slider supported by the pedestal portion having a thickness thicker than that of the dam portion with the dam portion can be surely prevented.

[4] The present invention includes the suspension board with circuit described in the above-described [3] in which the dam conductive layer is the wire.

In the suspension board with circuit, the dam conductive layer is the wire, so that damage of the wire in the dam portion having a thickness thinner than that of the pedestal portion is prevented, and connection reliability of the wire can be improved.

In the present invention, the outflow of the adhesive out of the slider mounting region is prevented by the dam portion, and the slider can be surely fixed to the slider mounting region by the adhesive.

BRIEF DESCRIPTION OF THE DRAWINGS

FIGS. 6A to 6D show process drawings for illustrating a method for producing the suspension board with circuit shown in FIG. 5:

FIGS. 7E to 7G, subsequent to FIG. 6D, show process drawings for illustrating a method for producing the suspension board with circuit shown in FIG. 5:

DETAILED DESCRIPTION OF THE INVENTION

Figure 1:
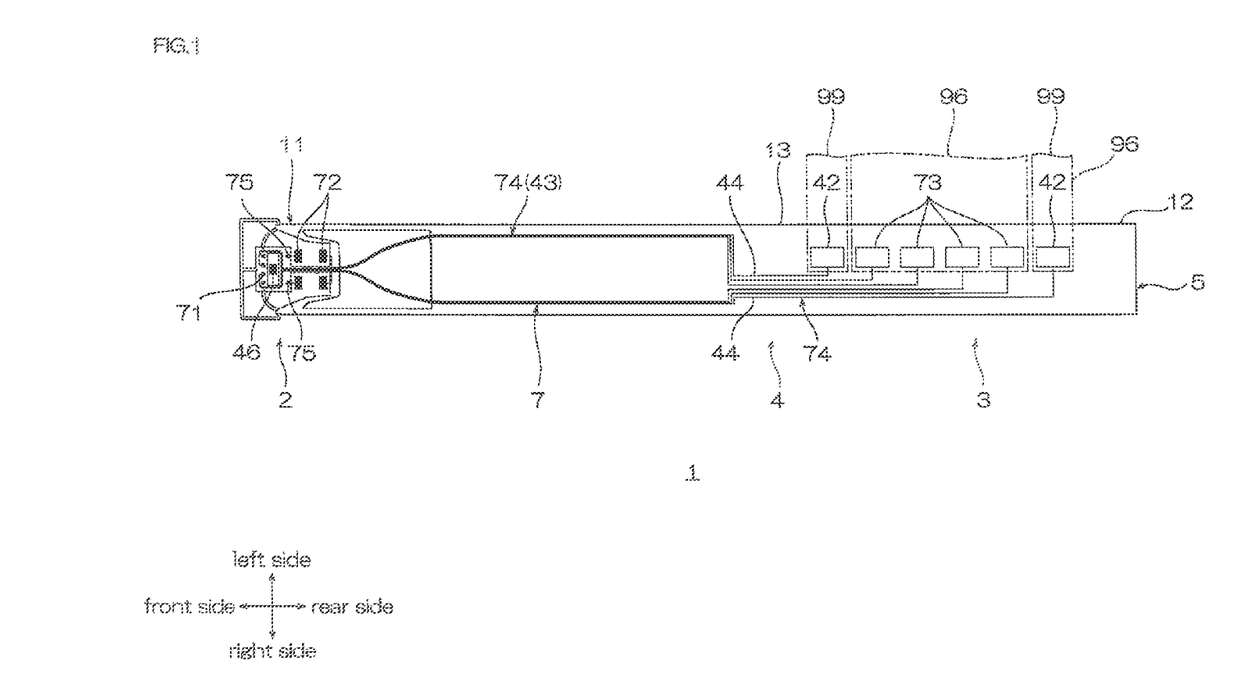
FIG. 1 shows a plan view for illustrating one embodiment of a suspension board with circuit of the present invention.

In FIG. 1, the right-left direction of the paper surface is referred to as a front-rear direction (first direction), the left side of the paper surface is referred to as a front side (one side in the first direction), and the right side of the paper surface is referred to as a rear side (the other side in the first direction). The up-down direction of the paper surface is referred to as a right-left direction (second direction orthogonal to the first direction), the upper side of the paper surface is referred to as a left side (one side in the second direction), and the lower side of the paper surface is referred to as a right side (the other side in the second direction). The paper thickness direction of the paper surface is referred to as an up-down direction (thickness direction, third direction orthogonal to the first direction and the second direction), the near side of the paper surface is referred to as an upper side (one side in the thickness direction, one side in the third direction), and the far side of the paper surface is referred to as a lower side (the other side in the thickness direction, the other side in the third direction). To be specific, directions are in conformity with direction arrows in each view.

Figure 2:
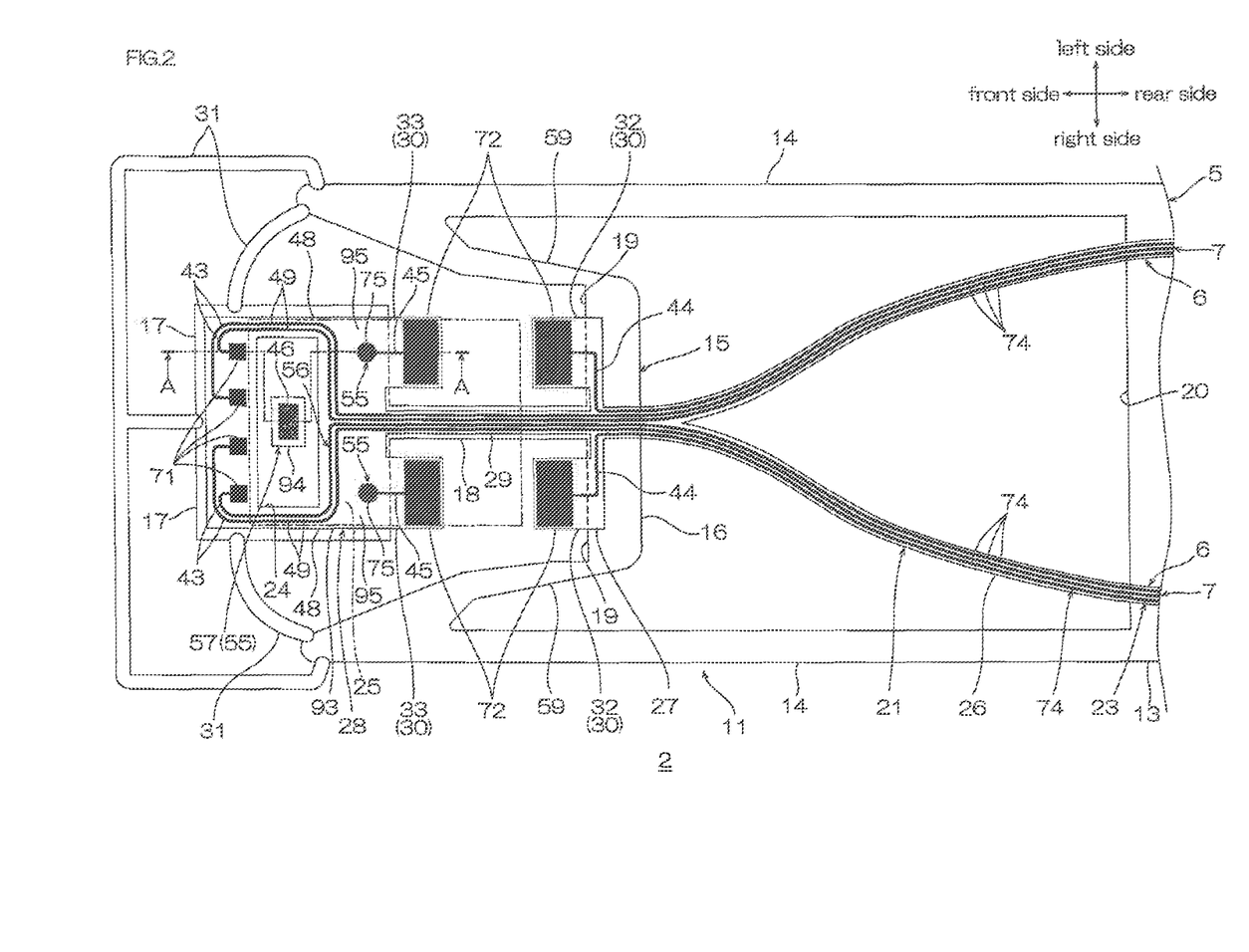
FIG. 2 shows an enlarged plan view of a gimbal portion of the suspension board with circuit shown in FIG. 1.

In FIG. 1, a base insulating layer 6 (described later) and a cover insulating layer 8 (described later) are omitted. In FIG. 2, the base insulating layer 6 is illustrated and the cover insulating layer 8 is omitted. Furthermore, in FIG. 4, the base insulating layer 6 and a second cover insulating layer 82 (described later) are illustrated and a first cover insulating layer 81 (described later) is omitted.

Figure 5:
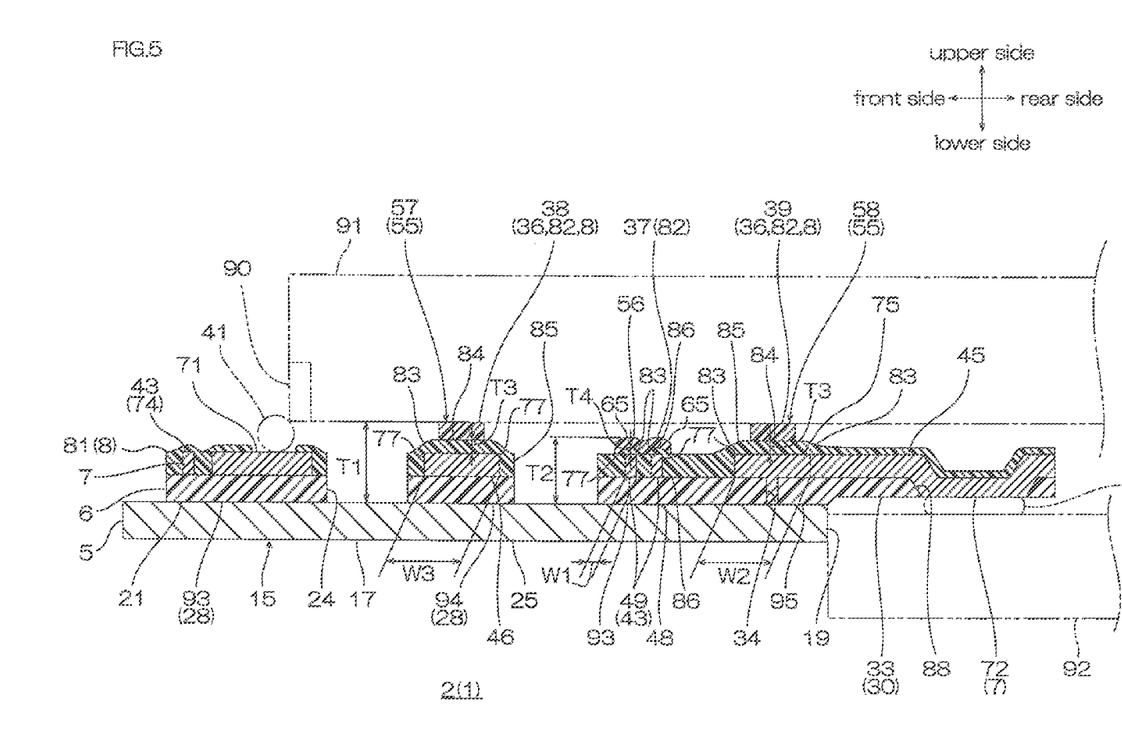
FIG. 5 shows a sectional view along an A-A line in FIGS. 2 and 4.

As shown in FIGS. 1 and 5, a suspension board with circuit 1, which is mounted with a slider 91 mounted with a magnetic head 90, and piezoelectric elements 92, is mounted on a hard disk drive (not shown) in a state of being electrically connected to an external board 96 and a power source 99.

The suspension board with circuit 1 is formed into a flat belt shape extending in the front-rear direction.

The suspension board with circuit 1 integrally includes a mounting portion 2 that is disposed at the front end portion and on which the slider 91 and the piezoelectric elements 92 are mounted; an external connecting portion 3 that is disposed at the rear end portion and is connected to the external board 96 and the power source 99; and a wire portion 4 that is disposed between the mounting portion 2 and the external connecting portion 3 and extends in the front-rear direction.

The suspension board with circuit 1 includes a metal supporting board 5, the base insulating layer 6, a conductive layer 7, and the cover insulating layer 8. That is, the suspension board with circuit 1 has a laminate structure. To be specific, the suspension board with circuit 1 is formed by sequentially laminating the metal supporting board 5, the base insulating layer 6, the conductive layer 7, and the cover insulating layer 8 from the lower side upwardly.

The metal supporting board 5 is formed into a flat plate shape and includes a gimbal portion 11 disposed in the mounting portion 2, a board external connecting portion 12 disposed in the external connecting portion 3, and a board wire portion 13 disposed in the wire portion 4.

Figure 3:
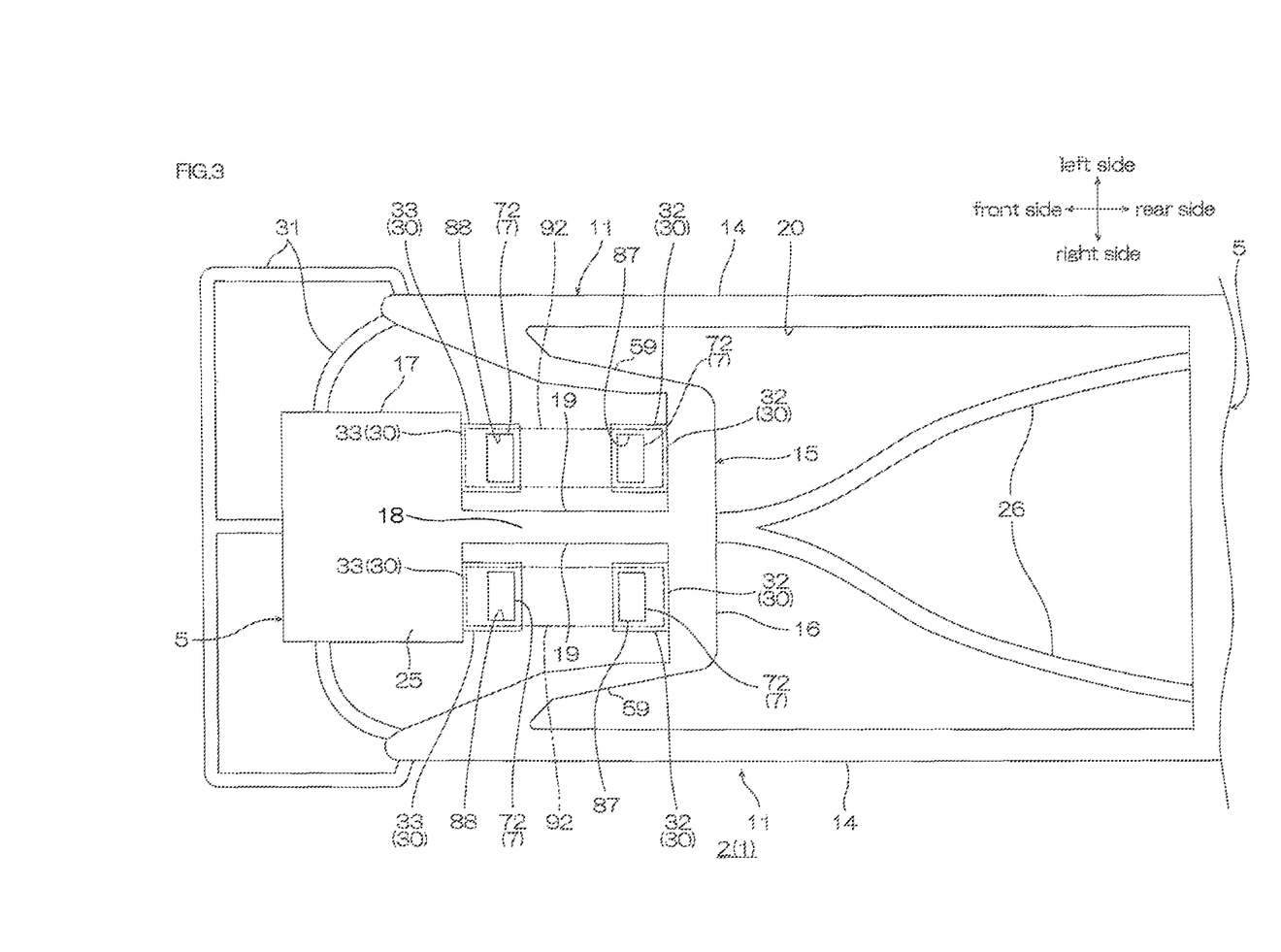
FIG. 3 shows an enlarged bottom view of the gimbal portion shown in FIG. 2.

As shown in FIG. 3, the gimbal portion 11 is disposed at the front end portion of the metal supporting board 5. At the central portion in the right-left direction of the gimbal portion 11, a board opening portion 20 in a generally rectangular shape in plane view passing through the metal supporting board 5 in the thickness direction is formed. The gimbal portion 11 includes outrigger portions 14 that are disposed at both outer sides in the right-left direction of the board opening portion 20, a mounting portion 15 that is disposed at the inner side in the right-left direction of the outrigger portions 14, and mounting portion-connecting portions 59 that connect the outrigger portions 14 to the mounting portion 15.

The outrigger portions 14 are both end portions in the right-left direction of the gimbal portion 11 and are formed so as to extend in a linear shape along the front-rear direction as one pair.

Figure 4:
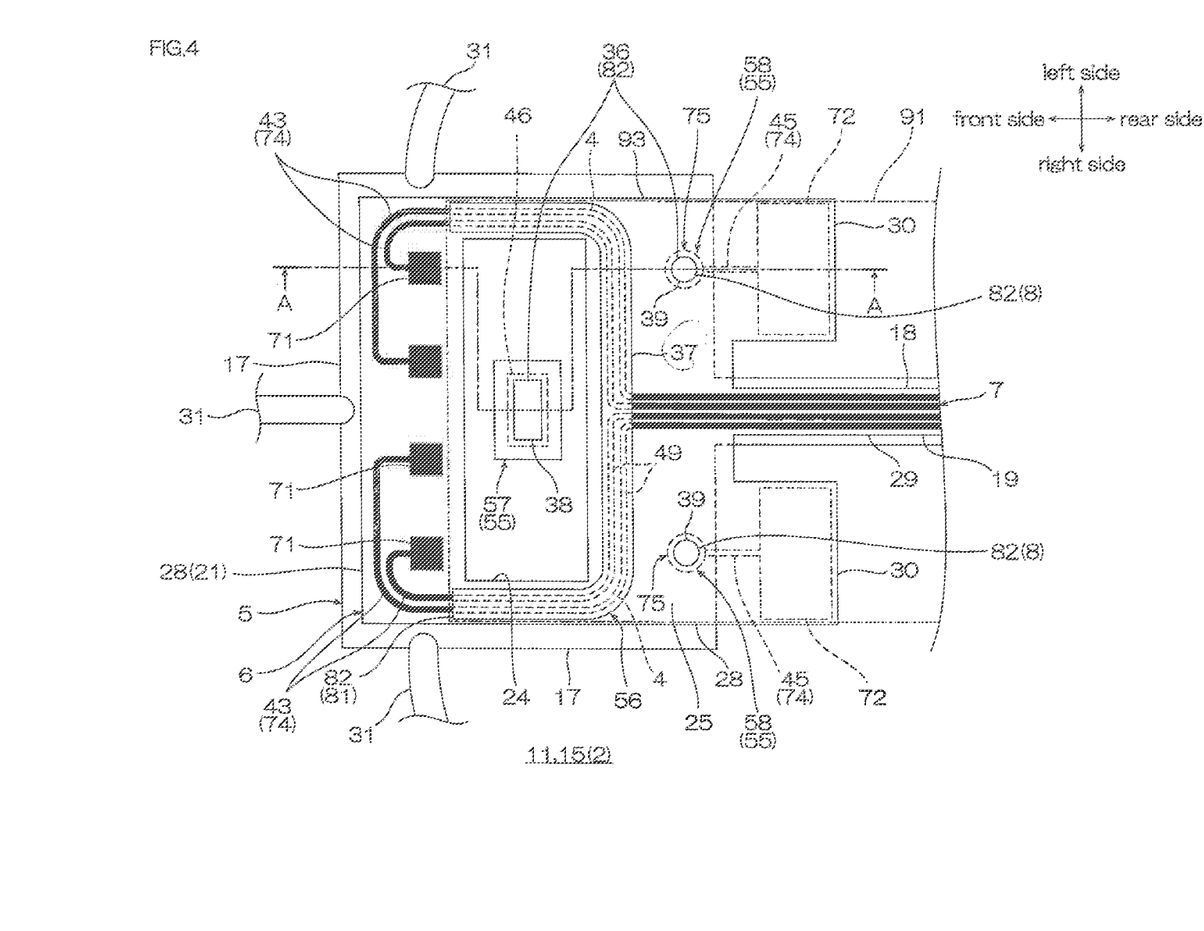
FIG. 4 shows an enlarged plan view of a pedestal portion and a dam portion in the gimbal portion shown in FIG. 2.

The mounting portion 15 is configured to mount the slider 91 (ref: FIG. 4) and the piezoelectric elements 92 thereon. The mounting portion 15 is, when projected in the front-rear direction, disposed so as to be positioned between the two pieces of outrigger portions 14. The mounting portion 15 is formed into a generally H-shape in plane view having an opening toward both outer sides in the right-left direction. That is, one pair of cut-out portions 19, which cut (have an opening in) the central portion in the front-rear direction of both end portions in the right-left direction, are formed in the mounting portion 15. The one pair of cut-out portions 19 are formed so as to pass through the metal supporting board 5 in the thickness direction. The mounting portion 15 integrally includes a board foundation portion 16 that extends long in the right-left direction in a generally rectangular shape in plane view, a board stage 17 that is disposed at spaced intervals to the front side of the board foundation portion 16 and extends long in the right-left direction in a generally rectangular shape in plane view, and a stage connecting portion 18 that connects the central portions in the right-left direction of the board foundation portion 16 and the board stage 17 and extends in the front-rear direction in a generally rectangular shape in plane view.

The length in the front-rear direction of the board stage 17 is formed to be longer than that of the board foundation portion 16. The rear end portion of the board stage 17 and the midway in the front-rear direction thereof are defined as a slider mounting region 25 that is configured to mount the slider 91 thereon.

The mounting portion-connecting portions 59 are formed so as to be disposed between the front end portions of the outrigger portions 14 and both end portions in the right-left direction of the board foundation portion 16. The mounting portion-connecting portions 59 are formed into cut piece shapes that gradually incline to both outer sides in the right-left direction toward the front side.

The metal supporting board 5 is, for example, formed of a metal material such as stainless steel, 42-alloy, aluminum, copper-beryllium, and phosphor bronze. Preferably, the metal supporting board 5 is formed of stainless steel. The metal supporting board 5 has a thickness of, for example, 10 μm or more, or preferably 15 μm or more, and, for example, 35 μm or less, or preferably 25 μm or less.

As shown in FIG. 5, the base insulating layer 6 is formed on the metal supporting board 5. As shown in FIG. 2, the base insulating layer 6 includes a base mounting portion 21 that is disposed in the mounting portion 2, a base external connecting portion (not shown) that is disposed in the external connecting portion 3 (ref: FIG. 1), and a base wire portion 23 that is disposed in the wire portion 4 (ref: FIG. 1).

As shown in FIGS. 2, 4, and 5, the base mounting portion 21 includes a wire supporting portion 26, a base foundation portion 27, a base stage 28, a base first connecting portion 29, element terminal forming portions 30, and base second connecting portions 31.

The wire supporting portion 26 is disposed over the board opening portion 20. To be specific, the wire supporting portion 26 is disposed so as to cross the board opening portion 20 in the front-rear direction. The wire supporting portion 26 is formed into a generally V-shape (or Y-shape) in plane view having an opening rearwardly.

The base foundation portion 27 is disposed on the board foundation portion 16 in the mounting portion 15. To be specific, on the upper surface of the board foundation portion 16, the base foundation portion 27 is formed into a generally T-shape in plane view extending from the front end portion of the wire supporting portion 26 toward both outer sides in the right-left direction.

The base stage 28 is disposed on the board stage 17 in the mounting portion 15. The base stage 28 includes a base frame 93 and a front-side pedestal base insulating layer 94.

The base frame 93 is formed into a generally rectangular frame shape in plane view having a smaller outer shape than that of the board stage 17. To be specific, the base frame 93 is formed into a generally rectangular frame shape in plane view exposing the front end portion, both end portions in the right-left direction, and the central portion of the board stage 17. As shown in FIGS. 2 and 5, in the central portion of the base frame 93 and both end portions in the right-left direction of the rear end portion thereof, one piece of base first opening portion 24 and two pieces of base second opening portions 34 (in FIG. 5, only the left-side base second opening portion 34 is shown) passing through the base insulating layer 6 in the thickness direction are formed.

The base first opening portion 24 is formed into a generally rectangular shape in plane view extending in the right-left direction.

Each of the two pieces of base second opening portions 34 is formed into a generally circular shape in plane view. The two pieces of base second opening portions 34 are disposed in opposed relation at spaced intervals to each other in the right-left direction.

In the base frame 93, each of the circumferential end portions of the two pieces of base second opening portions 34 is defined as a rear-side pedestal base insulating layer 95 in which grounding portions 75 (described later) are formed.

Furthermore, in the base frame 93, a portion between the rear-side pedestal base insulating layer 95 and the base first opening portion 24 is defined as a dam base insulating layer 48 in which a dam conductive layer 49 (described later) is formed.

The front-side pedestal base insulating layer 94 is disposed in the central portion of the base first opening portion 24. To be specific, the front-side pedestal base insulating layer 94 is disposed at the inner side at spaced intervals to the circumferential surface of the base first opening portion 24. The front-side pedestal base insulating layer 94 is formed into a generally rectangular shape in plane view extending in the right-left direction.

The base first connecting portion 29 is disposed on the stage connecting portion 18 in the mounting portion 15. To be specific, the base first connecting portion 29 is formed so as to connect the front end portion of the central portion in the right-left direction of the base foundation portion 27 to the rear end portion of the central portion in the right-left direction of the base stage 28. The base foundation portion 27 is formed into a generally rectangular shape in plane view extending in the front-rear direction so as to expose both end portions in the right-left direction of the stage connecting portion 18 in the mounting portion 15.

The element terminal forming portions 30 are disposed so as to face the cut-out portions 19. That is, the element terminal forming portions 30 are formed so that the lower surfaces thereof are exposed from the mounting portion 15. The element terminal forming portions 30 include rear-side element terminal forming portions 32 and front-side element terminal forming portions 33.

The rear-side element terminal forming portions 32 are formed into generally rectangular shapes in plane view extending from each of the front end edges of both outer-side portions in the right-left direction of the base foundation portion 27 forwardly. As shown in FIG. 3, the rear-side element terminal forming portions 32 face the rear end portions of the cut-out portions 19. The lower surfaces of the rear-side element terminal forming portions 32 are exposed at the inside of the cut-out portions 19. The rear-side element terminal forming portions 32 are formed to be thinner than the base foundation portion 27. In the front end portions of the rear-side element terminal forming portions 32, base third opening portions 87 passing through the base insulating layer 6 in the thickness direction are formed. The base third opening portions 87 are formed into generally rectangular shapes in plane view.

As shown in FIG. 2, the front-side element terminal forming portions 33 are formed into generally rectangular shapes in plane view extending from each of the rear end edges of both outer-side portions in the right-left direction of the base stage 28 rearwardly. As shown in FIG. 3, the front-side element terminal forming portions 33 face the front end portions of the cut-out portions 19. As shown in FIGS. 3 and 5, the lower surfaces of the front-side element terminal forming portions 33 are exposed at the inside of the cut-out portions 19. In the rear end portions of the front-side element terminal forming portions 33, base fourth opening portions 88 passing through the base insulating layer 6 in the thickness direction are formed. The base fourth opening portions 88 are formed into generally rectangular shapes in plane view.

As shown in FIG. 2, the base second connecting portions 31 are formed into cut piece shapes that connect the front end portions of the outrigger portions 14 to the board stage 17 in the mounting portion 15.

As referred to FIG. 1, the base external connecting portion that is not shown is disposed on the upper surface of the board external connecting portion 12 in the metal supporting board 5 in the external connecting portion 3.

As shown in FIG. 2, the base wire portion 23 is disposed on the board wire portion 13 in the metal supporting board 5. To be more specific, the base wire portion 23 is formed into a pattern connecting a wire supporting portion 26 in the base mounting portion 2 to the base external connecting portion (not shown) in the external connecting portion 3 (ref: FIG. 1) that is not shown.

The base insulating layer 6 is formed of a synthetic resin such as polyimide resin, polyamide imide resin, acrylic resin, polyether resin, nitrile resin, polyether sulfone resin, polyethylene terephthalate resin, polyethylene naphthalate resin, and polyvinyl chloride resin. Preferably, the base insulating layer 6 is formed of polyimide resin.

The base insulating layer 6 has a thickness of, for example, 1 μm or more, or preferably 3 μm or more, and, for example, 25 μm or less, or preferably 15 μm or less.

The base first opening portion 24 has a length in the front-rear direction of, for example, 10 μm or more, or preferably 20 μm or more, and, for example, 500 μm or less, or preferably 400 μm or less and has a length in the right-left direction of, for example, 50 μm or more, or preferably 100 μm or more, and, for example, 1000 μm or less, or preferably 800 μm or less.

As shown in FIG. 5, the base second opening portion 34 has a diameter of, for example, 5 μm or more, or preferably 10 μm or more, and, for example, 100 μm or less, or preferably 90 μm or less.

As shown in FIG. 1, the conductive layer 7 includes head-side terminals 71, piezoelectric-side terminals 72, external terminals 73, power source terminals 42, wires 74, the grounding portions 75, and a front-side pedestal conductive layer 46.

A plurality (four pieces) of head-side terminals 71 are provided in the mounting portion 2. To be specific, as shown in FIGS. 2 and 5, the plurality of head-side terminals 71 are disposed on the upper surface of the front end portion of the base frame 93 in the base insulating layer 6. The plurality of head-side terminals 71 are disposed in alignment at spaced intervals to each other in the right-left direction so as to be along the front end edge of the base first opening portion 24.

As shown in FIG. 3, a plurality (four pieces) of piezoelectric-side terminals 72 are provided in the mounting portion 2. The plurality of piezoelectric-side terminals 72 are disposed at the inside of the cut-out portions 19. To be specific, the piezoelectric-side terminals 72 are formed so as to fill the base third opening portions 87 and the base fourth opening portions 88. As referred to FIG. 5, the lower surfaces of the piezoelectric-side terminals 72 are, in the front-rear and right-left directions, formed to be flush with the lower surfaces of the rear-side element terminal forming portions 32 around the base third opening portions 87 (not shown in FIG. 5) and the lower surfaces of the front-side element terminal forming portions 33 around the base fourth opening portions 88.

As shown in FIG. 1, a plurality (four pieces) of external terminals 73 are provided in the external connecting portion 3. To be specific, the plurality of external terminals 73 are disposed on the upper surface of the base external connecting portion (not shown) in the base insulating layer 6. The plurality of external terminals 73 are disposed in opposed relation at spaced intervals to each other in the front-rear direction. The plurality of external terminals 73 are signal terminals that are electrically connected to the external board 96.

Two pieces of power source terminals 42 are provided in the external connecting portion 3. To be specific, the two pieces of power source terminals 42 are disposed in opposed relation at both outer sides in the front-rear direction of the external terminals 73 on the upper surface of the base external connecting portion (not shown) in the base insulating layer 6. The power source terminals 42 are electrically connected to the power source 99.

As shown in FIG. 2, a plurality (eight pieces) of wires 74 are provided at least in the mounting portion 2. The wires 74 include signal wires 43, power source wires 44, and grounding wires 45.

As shown in FIG. 1, a plurality (four pieces) of signal wires 43 are provided over the external connecting portion 3, the wire portion 4, and the mounting portion 2. As shown in FIG. 5, the plurality of signal wires 43 are disposed on the base insulating layer 6. To be specific, as referred to FIG. 1, the plurality of signal wires 43 are formed so as to bend from the right end portions of external terminals 73 forwardly on the upper surface of the base external connecting portion (not shown) in the external connecting portion 3 and to extend forwardly on the upper surface of the base wire portion 23 in the wire portion 4. As shown in FIG. 2, the plurality of signal wires 43 extend in the front-rear direction on the upper surface of the wire supporting portion 26 in the mounting portion 2; subsequently, go along the base first connecting portion 29; and thereafter, are wired in a generally frame shape on the upper surface of the base stage 28. To be specific, the plurality of signal wires 43 are formed so as to bend toward both outer sides in the right-left direction in the central portion of the rear end portion of the base frame 93; subsequently extend from both end portions in the right-left direction of the rear end portion toward both end portions in the right-left direction of the front end portion; and next, bend inwardly in the right-left direction to be then connected to the front end portions of the head-side terminals 71. The plurality of signal wires 43 are formed into a generally square U-shape (generally U-shape) in plane view having an opening forwardly in the rear end portion of the base frame 93 and both end portions in the right-left direction thereof, and the plurality of signal wires 43 in the portion serve as the dam conductive layer 49. The signal wires 43 transmit electrical signals between the magnetic head 3 (ref: FIG. 5) and the external board 96 (ref: FIG. 1).

As shown in FIG. 1, two pieces of power source wires 44 are provided over the external connecting portion 3, the wire portion 4, and the mounting portion 2. To be specific, the two pieces of power source wires 44 bend from the right end portions of the power source terminals 42 forwardly on the upper surface of the base external connecting portion (not shown) in the external connecting portion 3 and extend forwardly so as to sandwich the plurality of signal wires 43 in the right-left direction therebetween on the upper surface of the base wire portion 23. As shown in FIG. 2, the two pieces of power source wires 44 extend forwardly on the upper surface of the wire supporting portion 26 in the wire portion 4 and thereafter, bend toward both outer sides in the right-left direction of the base foundation portion 27 in the mounting portion 2 to be then connected to the rear end portions of the piezoelectric-side terminals 72. The power source wires 44 supply electric power to the piezoelectric elements 92 (ref: FIGS. 3 and 5).

As shown in FIG. 2, two pieces of grounding wires 45 are provided in the mounting portion 2. To be specific, the two pieces of grounding wires 45 are disposed over the base stage 28 and the front-side element terminal forming portion 33. Each of the two pieces of grounding wires 45 is formed into a linear shape extending in the front-rear direction in the base stage 28 and the front-side element terminal forming portion 33. The rear end portions of the grounding wires 45 are connected to the front end portions of the piezoelectric-side terminals 72. The grounding wires 45 ground the piezoelectric elements 92.

Two pieces of grounding portions 75 are provided in the mounting portion 2. To be specific, each of the two pieces of grounding portions 75 is disposed on both end portions in the right-left direction of the rear end portion of the base stage 28. To be more specific, as shown in FIGS. 2 and 5, each of the two pieces of grounding portions 75 is, in plane view, formed into a generally circular shape including each of the two pieces of base second opening portions 34, and is formed over the inner-side surface of the base second opening portion 34, the upper surface of the board stage 17 exposed from the base second opening portion 34, and furthermore, the upper surface of the base stage 28 of the circumferential end portion of the base second opening portion 34. That is, the central portion of the grounding portion 75 is formed so as to fill the base second opening portion 34. The front end portions of the grounding wires 45 are connected to the rear end portions of the grounding portions 75. The grounding portions 75 also serve as a rear-side pedestal conductive layer.

One piece of front-side pedestal conductive layer 46 is provided in the mounting portion 2. The front-side pedestal conductive layer 46 is formed on the base mounting portion 21. The front-side pedestal conductive layer 46 is disposed on the front-side pedestal base insulating layer 94. To be specific, the front-side pedestal conductive layer 46 is disposed in the center of the upper surface of the pedestal base insulating layer 94. The front-side pedestal conductive layer 46 is formed into a generally rectangular shape in plane view that extends in the right-left direction and is smaller than the front-side pedestal base insulating layer 94. The front-side pedestal conductive layer 46 is formed so as to expose the circumferential end portion of the pedestal base insulating layer 94. The front-side pedestal conductive layer 46 constitute a pedestal conductive layer (described later) along with the two pieces of grounding portions 75 (rear-side pedestal conductive layers).

The conductive layer 7 is, for example, formed of a conductive material such as copper, nickel, gold, and solder or an alloy thereof. Preferably, the conductive layer 7 is formed of copper.

The conductive layer 7 has a thickness of, for example, 1 μm or more, or preferably 3 μm or more, and, for example, 20 μm or less, or preferably 12 μm or less.

As shown in FIG. 5, each of the wires 74 has a width W1 (one example of the minimum size in a direction orthogonal to the thickness direction) of, for example, 8 μm or more, or preferably 10 μm or more, and, for example, 250 μm or less, or preferably 200 μm or less.

Each of the grounding portions 75 (rear-side pedestal conductive layers) has a diameter (maximum length) W2 of, for example, 15 μm or more, or preferably 20 μm or more, and, for example, 200 μm or less, or preferably 180 μm or less.

The front-side pedestal conductive layer 46 has a width W3 (length in the front-rear direction, one example of the minimum size in a direction orthogonal to the thickness direction) of, for example, 15 μm or more, or preferably 20 μm or more, and, for example, 500 μm or less, or preferably 400 μm or less. As shown in FIG. 2, the front-side pedestal conductive layer 46 has a length in the right-left direction of, for example, 30 μm or more, or preferably 40 μm or more, and, for example, 500 μm or less, or preferably 400 μm or less.

As shown in FIG. 5, the diameter W2 of each of the grounding portions 75 and the width W3 of the front-side pedestal conductive layer 46 are larger than the width W1 of each of the wires 74 (including the dam conductive layer 49), to be specific, by, for example, 1.5 times or more, or preferably twice or more, and, for example, 50 times or less, or preferably 40 times or less.

As referred to FIGS. 1 and 5, the cover insulating layer 8 is disposed on the base insulating layer 6 over the mounting portion 2, the external connecting portion 3, and the wire portion 4 so as to cover the conductive layer 7. The cover insulating layer 8 includes the first cover insulating layer 81 and the second cover insulating layer 82.

The outer shape of the first cover insulating layer 81 is formed into the same as that of the base insulating layer 6. The first cover insulating layer 81 is formed so as to cover the upper and side surfaces of the wires 74, the grounding portions 75, and the front-side pedestal conductive layer 46. The first cover insulating layer 81 is formed into a pattern exposing the upper surfaces of the head-side terminals 71, the external terminals 73 (not shown in FIG. 5), and the power source terminals 42 (not shown in FIG. 5). The first cover insulating layer 81 includes a pedestal first cover insulating layer 85 and a dam first cover insulating layer 86.

The pedestal first cover insulating layer 85 covers the upper and side surfaces of the front-side pedestal conductive layer 46 and the grounding portions 75 (pedestal conductive layers). The pedestal first cover insulating layer 85 has flat portions 84 that expands in both directions of right-left direction and front-rear direction corresponding to the upper surfaces of the front-side pedestal conductive layer 46 and the grounding portions 75 (pedestal conductive layers) and curved portions 83 corresponding to upper end portions (ridge portions formed by the side and upper surfaces and having a right angle portion) 77 of the front-side pedestal conductive layer 46 and the grounding portions 75 (pedestal conductive layers). In the pedestal first cover insulating layer 85, the flat portions 84 connect (are interposed between) the curved portions 83 that are disposed at both sides of the flat portions 84.

The dam first cover insulating layer 86 covers the upper and side surfaces of the dam conductive layer 49. The dam first cover insulating layer 86 has the curved portions 83 corresponding to the upper end portions 77 of the dam conductive layer 49, while not having the above-described flat portions 84.

Two pieces of curved portions 83 corresponding to two pieces of upper end portions 77 that are positioned at both sides in the front-rear direction of each of the dam conductive layers 49 are continuous at the upper ends thereof. That is, the flat portions 84 are not connected (interposed) in the same manner as that in the pedestal first cover insulating layer 85. The two pieces of curved portions 83 corresponding to the two pieces of upper end portions 77 that are positioned at both sides in the right-left direction of each of the dam conductive layers 49 are continuous at the upper ends thereof. The dam first cover insulating layer 86 has protruded portions 65 that protrude upwardly in curved shapes.

As shown in FIGS. 4 and 5, the second cover insulating layer 82 is provided in the mounting portion 2. The second cover insulating layer 82 is disposed on the upper surface of the first cover insulating layer 81. The second cover insulating layer 82 includes a pedestal second cover insulating layer 36 and a dam second cover insulating layer 37.

The pedestal second cover insulating layer 36 is disposed on the upper surface of the pedestal first cover insulating layer 85. To be specific, the pedestal second cover insulating layer 36 is disposed on the upper surfaces of the flat portions 84 in the pedestal first cover insulating layer 85. The pedestal second cover insulating layer 36 includes a front-side pedestal second cover insulating layer 38 and rear-side pedestal second cover insulating layers 39.

The front-side pedestal second cover insulating layer 38 is disposed so as to correspond to the front-side pedestal conductive layer 46. To be specific, the front-side pedestal second cover insulating layer 38 is, when projected in the thickness direction, formed into a generally rectangular shape in plane view that is included in the front-side pedestal conductive layer 46 and extends in the right-left direction. The cross-sectional shape of the front-side pedestal second cover insulating layer 38 obtained by being cut along the front-rear and thickness directions is formed into a generally rectangular shape extending in the front-rear direction. Although not shown in FIG. 5, the cross-sectional shape of the front-side pedestal second cover insulating layer 38 obtained by being cut along the right-left and thickness directions is formed into a generally rectangular shape extending in the right-left direction.

Two pieces of rear-side pedestal second cover insulating layers 39 are provided and are disposed at the rear side of the front-side pedestal second cover insulating layer 38 in a projected surface projected in the right-left direction. Each of the two pieces of rear-side pedestal second cover insulating layers 39 is, when projected in the thickness direction, formed into a generally circular shape in plane view included in each of the two pieces of grounding portions 75 (rear-side pedestal conductive layers). The cross-sectional shapes of the rear-side pedestal second cover insulating layers 39 obtained by being cut in the front-rear and thickness directions are formed into generally rectangular shapes extending in the front-rear direction. Although not shown in FIG. 5, the cross-sectional shapes of the rear-side pedestal second cover insulating layers 39 obtained by being cut in the right-left and thickness directions are formed into generally rectangular shapes extending in the right-left direction.

The dam second cover insulating layer 37 is disposed on the upper surface of the dam first cover insulating layer 86. The dam second cover insulating layer 37 is formed into a shape in plane view corresponding to the dam conductive layer 49. That is, the outer shape of the dam second cover insulating layer 37 is formed into a generally U-shape (square U-shape) having an opening forwardly. The dam second cover insulating layer 37 is, in plane view, interposed between the front-side pedestal second cover insulating layer 38 and the rear-side pedestal second cover insulating layers 39. To be more specific, the dam second cover insulating layer 37 is, in plane view, formed so as to house the base first opening portion 24. More specifically, the dam second cover insulating layer 37 is, in plane view, formed so that the inner surface thereof is spaced apart from the circumferential surface of the base first opening portion 24. The dam second cover insulating layer 37 is disposed at spaced intervals to the front sides of the two pieces of rear-side pedestal second cover insulating layers 39 (grounding portions 75).

The dam second cover insulating layer 37 is, in sectional view, formed into a curved shape (to be specific, generally wave shape in plane view) along the upper surfaces of the curved portions 83 in the dam first cover insulating layer 86 without having a flat portion. The dam second cover insulating layer 37 is formed to be thinner than the pedestal second cover insulating layer 36.

The cover insulating layer 8 is formed of the same synthetic resin as that of the base insulating layer 6. Preferably, the cover insulating layer 8 is formed of polyimide resin.

The size of the cover insulating layer 8 is appropriately set.

The pedestal first cover insulating layer 85 has a thickness of, for example, 1 μm or more, or preferably 2 μm or more, and, for example, 10 μm or less, or preferably 9 μm or less. The thickness of the pedestal first cover insulating layer 85 is, in the pedestal first cover insulating layer 85, a length T3 from the upper surface of the front-side pedestal conductive layer 46 to the upper surface of the pedestal first cover insulating layer 85.

The thickness of the dam first cover insulating layer 86 is thinner than that of the pedestal first cover insulating layer 85. In other words, the thickness of the pedestal first cover insulating layer 85 is thicker than that of the dam first cover insulating layer 86.

To be more specific, portions of the pedestal first cover insulating layer 85 that are positioned laterally from each of the front-side pedestal conductive layer 46 and the grounding portion 75 swell upwardly to form one curved portion 83; then, to form the flat portions 84 on the front-side pedestal conductive layer 46 and the grounding portion 75; thereafter, to form the other curved portion 83; and finally, to be sunk downwardly. Thus, the thickness of the pedestal first cover insulating layer 85 can be sufficiently ensured based on the formation of the flat portion 84.

In contrast, a portion of the dam first cover insulating layer 86 that is positioned laterally from the dam conductive layer 49 (signal wire 43) swells upwardly to form one curved portion 83; then, to form the protruded portions 65 (that is, the flat portion 84 is not formed); next, to be continuous to the other curved portion 83; and to be sunk downwardly. Thus, the curved portion 83 is not formed, so that the thickness of the dam first cover insulating layer 86 is thinner than that of the pedestal first cover insulating layer 85. That is, the thickness of the pedestal first cover insulating layer 85 is thicker than that of the dam first cover insulating layer 86.

To be specific, the thickness of the pedestal first cover insulating layer 85 with respect to that of the dam first cover insulating layer 86 is, for example, 110% or more, preferably 120% or more, or more preferably 130% or more, and, for example, 200% or less.

To be specific, the dam first cover insulating layer 86 has a thickness of, for example, 0.5 μm or more, or preferably 1 μm or more, and, for example, 9 μm or less, or preferably 8 μm or less. The thickness of the dam first cover insulating layer 86 is, in the dam first cover insulating layer 86, a length T4 from the upper surface of the dam conductive layer 49 to the upper surface of the dam first cover insulating layer 86.

The pedestal second cover insulating layer 36 has a thickness of, for example, 1 μm or more, or preferably 2 μm or more, and, for example, 10 μm or less, or preferably 9 μm or less.

The dam second cover insulating layer 37 has a thickness of, for example, 0.5 μm or more, or preferably 1 μm or more, and, for example, 9 μm or less, or preferably 8 μm or less.

The suspension board with circuit 1 includes a pedestal portion 55 and a dam portion 56.

The pedestal portion 55 is configured to support the slider 91. To be specific, the pedestal portion 55 includes a front-side pedestal 57 and rear-side pedestals 58.

One piece of front-side pedestal 57 is provided in the slider mounting region 25 in the mounting portion 2. The front-side pedestal 57 includes the front-side pedestal base insulating layer 94, the front-side pedestal conductive layer 46 that is disposed on the upper surface of the front-side pedestal base insulating layer 94, the pedestal first cover insulating layer 85 that covers the upper and side surfaces of the front-side pedestal conductive layer 46, and the pedestal second cover insulating layer 36 that is disposed on the upper surface of the pedestal first cover insulating layer 85 corresponding to the front-side pedestal conductive layer 46. That is, the front-side pedestal 57 has a laminate structure in which the front-side pedestal base insulating layer 94, the front-side pedestal conductive layer 46, the pedestal first cover insulating layer 85, and the pedestal second cover insulating layer 36 are sequentially laminated from the lower side upwardly.

Two pieces of rear-side pedestals 58 are provided in the mounting portion 2. The two pieces of rear-side pedestals 58 are, in a projected surface projected in the right-left direction, disposed at the rear side with respect to the front-side pedestal 57. The two pieces of rear-side pedestals 58 are disposed in opposed relation at spaced intervals to each other in the right-left direction. The two pieces of rear-side pedestals 58 include the rear-side pedestal base insulating layer 95, the grounding portion 75 that is disposed on the upper surface of the rear-side pedestal base insulating layer 95, the pedestal first cover insulating layer 85 that covers the upper and side surfaces of the grounding portion 75, and the pedestal second cover insulating layer 36 that is disposed on the upper surface of the pedestal first cover insulating layer 85 corresponding to the grounding portion 75. The rear-side pedestals 58 have a laminate structure in which the rear-side pedestal base insulating layer 95, the grounding portion 75, the pedestal first cover insulating layer 85, and the pedestal second cover insulating layer 36 are sequentially laminated from the lower side upwardly.

That is, the pedestal portion 55 includes the front-side pedestal base insulating layer 94 and the rear-side pedestal base insulating layer 95 (pedestal base insulating layers) that are included in the base insulating layer 6; the front-side pedestal conductive layer 46 and the grounding portion 75 (pedestal conductive layers) that are included in the conductive layer 7 and are disposed on the upper surfaces of the front-side pedestal base insulating layer 94 and the rear-side pedestal base insulating layer 95; the pedestal first cover insulating layer 85 that is included in the first cover insulating layer 81 and covers the upper and side surfaces of the front-side pedestal conductive layer 46 and the grounding portion 75; and the front-side pedestal second cover insulating layer 38 and the rear-side pedestal second cover insulating layer 39 (pedestal second cover insulating layer 36) that are included in the second cover insulating layer 82 and are disposed on the upper surface of the pedestal first cover insulating layer 85.

Thus, the pedestal portion 55 has a thickness T1 of, for example, 10 μm or more, or preferably 15 μm or more, and, for example, 50 μm or less, or preferably 45 μm or less.

The dam portion 56 is configured to prevent an adhesive 22 from flowing out of the slider mounting region 25. One piece of dam portion 56 is provided in the slider mounting region 25. The dam portion 56 includes the dam base insulating layer 48, the dam conductive layer 49 that is disposed on the upper surface of the dam base insulating layer 48, the dam first cover insulating layer 86 that covers the upper and side surfaces of the dam conductive layer 49, and the dam second cover insulating layer 37 that is disposed on the upper surface of the dam first cover insulating layer 86. That is, the dam portion 56 has a laminate structure in which the dam base insulating layer 48, the dam conductive layer 49, the dam first cover insulating layer 86, and the dam second cover insulating layer 37 are sequentially laminated from the lower side upwardly.

Thus, a thickness T2 of the dam portion 56 is thinner than the thickness T1 of the pedestal portion 55. In other words, the thickness T1 of the pedestal portion 55 is thicker than the thickness T2 of the dam portion 56. The thickness T2 of the dam portion 56 with respect to the thickness T1 of the pedestal portion 55 is, for example, 99% or less, preferably 98% or less, or more preferably 95% or less, and, for example, 60% or more. To be specific, the dam portion 56 has the thickness T2 of, for example, 0.5 μm or more, or preferably 1 μm or more, and, for example, 10 μm or less, or preferably 8 μm or less.

Next, a method for producing the suspension board with circuit 1 and a method for connecting the slider 91, the piezoelectric elements 92, the external board 96, and the power source 99 to the suspension board with circuit 1 obtained by the producing method are sequentially described with reference to FIGS. 6A to 6D and 7E to 7G.

Figure 6A:
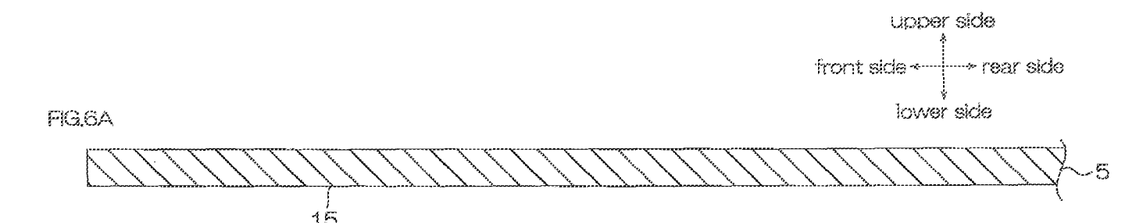
FIG. 6A illustrating a step of preparing a metal supporting board.

In this method, as shown in FIG. 6A, first, the metal supporting board 5 is prepared.

Figures 6B, 6C:
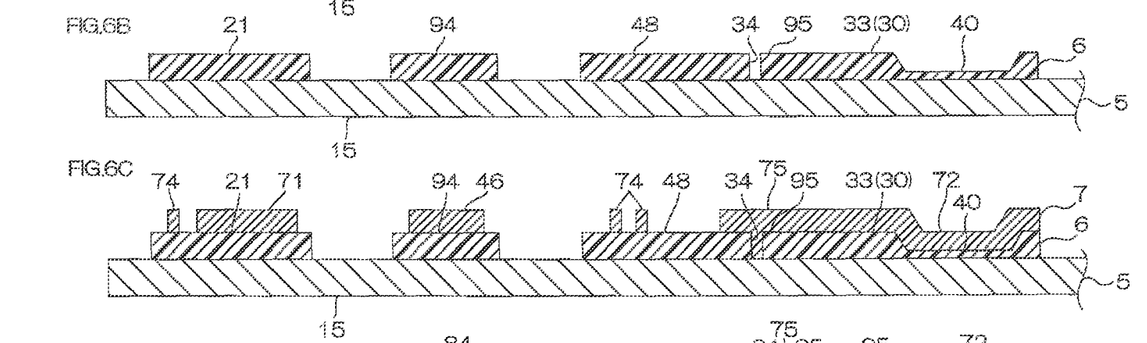
FIG. 6B illustrating a step of forming a base insulating layer.
FIG. 6C illustrating a step of forming a conductive layer.

Next, as shown in FIG. 6B, the base insulating layer 6 is formed on the metal supporting board 5. To be specific, the base insulating layer 6 is formed into a pattern including the base mounting portion 21 that includes the front-side pedestal base insulating layer 94 and the rear-side pedestal base insulating layer 95 (pedestal base insulating layers), and the dam base insulating layer 48 described above; the base external connecting portion (not shown); and the base wire portion 23 (ref: FIG. 2). The rear-side element terminal forming portion 32 and the front-side element terminal forming portion 33 are formed so as to have a thin portion 40 corresponding to the base second opening portions 87 and the base third opening portions 88 that are formed later (ref: FIGS. 3 and 7G).

To be specific, a varnish containing a synthetic resin having photosensitivity is applied onto the metal supporting board 5 to be then dried, thereby forming a base film. Thereafter, the base film is subjected to gradation exposure to light via a photomask that is not shown. Then, the base film is developed and is, if necessary, cured by heating.

Next, as shown in FIG. 6C, the conductive layer 7 is formed on the base insulating layer 6. To be specific, the conductive layer 7 is formed so as to include the head-side terminals 71, the piezoelectric-side terminals 72, the external terminals 73 (ref: FIG. 1), the power source terminals 42 (ref: FIG. 1), the wires 74, the grounding portions 75, and the front-side pedestal conductive layer 46. The piezoelectric-side terminals 72 are formed on the upper surface of the thin portion 40. The grounding portions 75 are formed so that the central portions of the grounding portions 75 fill the base second opening portions 34 to be brought into contact with the upper surface of the mounting portion 15 in the metal supporting board 5, and the circumferential end portions of the grounding portions 75 are disposed on the upper surface of the base stage 28 in the circumferential end portions of the base second opening portions 34.

The conductive layer 7 is, for example, formed into the above-described pattern by an additive method or a subtractive method.

Figure 6D:
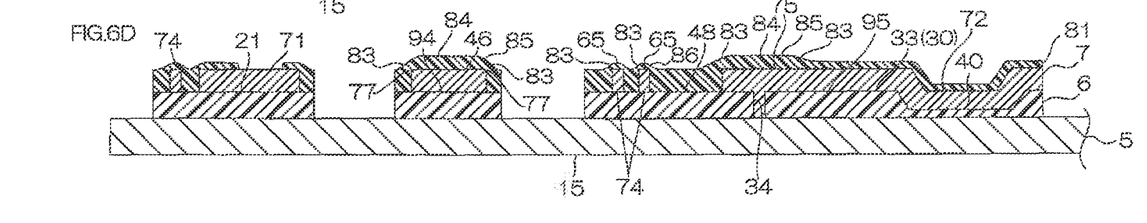
FIG. 6D illustrating a step of forming a first cover insulating layer.

Next, as shown in FIG. 6D, the first cover insulating layer 81 is formed into the above-described pattern having the pedestal first cover insulating layer 85 and the dam first cover insulating layer 86.

To form the first cover insulating layer 81, for example, a varnish containing a synthetic resin having photosensitivity is applied onto the metal supporting board 5, the base insulating layer 6, and the conductive layer 7 to be then dried, thereby forming a cover film. At this time, the cover film has the curved portion 83 and fails to have the flat portion 84 in a portion corresponding to the dam first cover insulating layer 86, while having the curved portion 83 and the flat portion 84 in a portion corresponding to the pedestal first cover insulating layer 85.

Thereafter, the cover film is subjected to exposure to light via a photomask that is not shown. Then, the cover film is developed and is, if necessary, cured by heating.

The formation of the first cover insulating layer 81 is not limited to the above-described method. For example, the first cover insulating layer 81 is prepared from the above-described synthetic resin into the above-described pattern, and the prepared first cover insulating layer 81 can be also attached to the base insulating layer 6 and the conductive layer 7 via a known adhesive layer.

Figure 7E:
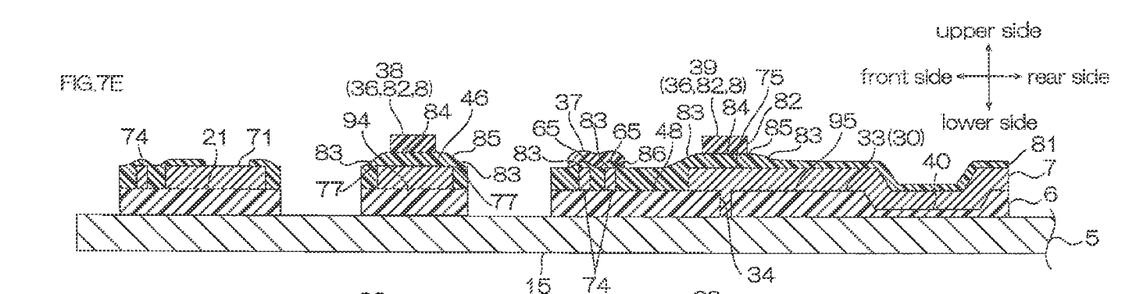
FIG. 7E illustrating a step of forming a second cover insulating layer.
Figures 7F, 7G:
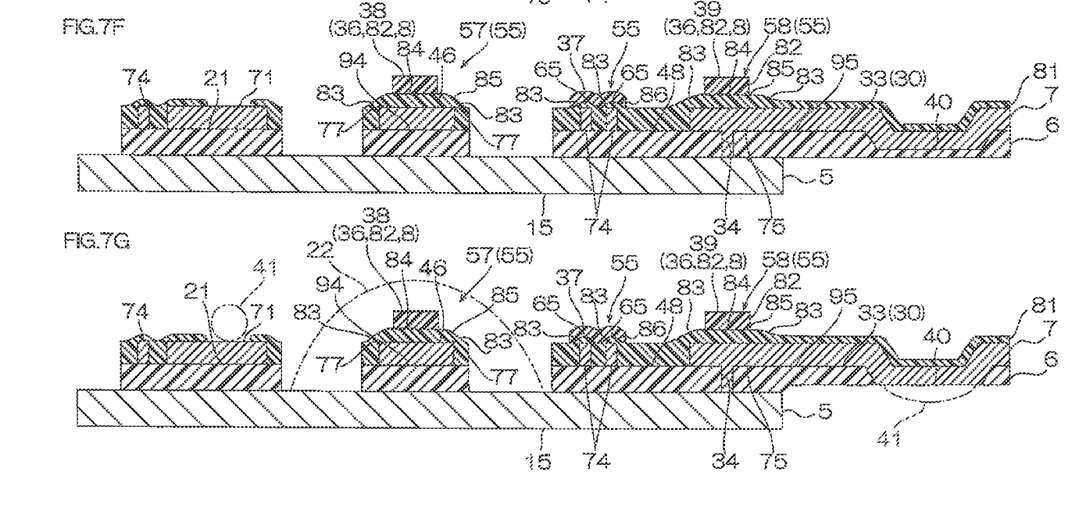
FIG. 7F illustrating a step of trimming the metal supporting board.
FIG. 7G illustrating a step of removing a thin portion of the base insulating layer.

Next, as shown in FIG. 7E, the second cover insulating layer 82 is formed on the first cover insulating layer 81. To be specific, the second cover insulating layer 82 is formed on the upper surface of the first cover insulating layer 81 in the above-described pattern including the pedestal second cover insulating layer 36 and the dam second cover insulating layer 37.

The second cover insulating layer 82 is formed by the same method as that of the first cover insulating layer 81.

In this manner, the pedestal portion 55 and the dam portion 56 are formed.

Next, as shown in FIG. 7F, the metal supporting board 5 is trimmed. In this manner, the metal supporting board 5 including the mounting portion 2, the external connecting portion 3, and the wire portion 4 is formed.

Next, as shown in FIG. 7G, the lower end portion of the element terminal forming portion 30 is removed so as to remove the thin portion 40 in the base insulating layer 6. In this manner, the lower surfaces of the piezoelectric-side terminals 72 are exposed from the base third opening portions 88 and the base second opening portions 87.

Thereafter, as shown by a phantom line in FIG. 7G, the adhesive 22 is disposed at the inside of the base first opening portion 24. The adhesive 22 is disposed so as to embed (cover) the front-side pedestal 57.

The adhesive 22 is disposed so as to fix the slider 91. The adhesive 22 is liquid or semi-solid and is prepared from an adhesive having fluidity. Or, the adhesive 22 can be also prepared from a solid adhesive having fluidity by heating.

Also, an electrically conductive bonding agent 41 is disposed on the upper surfaces of the head-side terminals 71, the external terminals 73, and the power source terminals 42 (ref: FIG. 1) and the lower surfaces of the piezoelectric-side terminals 72. The electrically conductive bonding agent 41 is, for example, prepared from a solder having low melting point or an electrically conductive material such as an electrically conductive adhesive.

Thereafter, as shown by the phantom lines in FIGS. 4 and 5, the slider 91 is disposed in the slider mounting region 25 and is fixed thereto by the adhesive 22. The slider 91 is formed into a generally box shape extending in the front-rear and right-left directions.

To be specific, the lower surface of the slider 91 is disposed on the upper surface (to be specific, the upper surface of the second cover insulating layer 82) of the pedestal portion 55. At this time, the adhesive 22 that is positioned on the upper surface of the pedestal portion 55 is pressed by the lower surface of the slider 91 and is pushed aside from the pedestal portion 55 outwardly. The upper surface of the pedestal portion 55 is brought into contact with the lower surface of the slider 91. Meanwhile, the upper surface of the dam portion 56 is spaced apart from the lower surface of the slider 91 in the up-down direction.

The magnetic head 90 that is mounted on the slider 91 is electrically connected to the head-side terminals 71 via the electrically conductive bonding agent 41.

As shown in FIGS. 3 and 5, the piezoelectric elements 92 are disposed at the inside of the cut-out portions 19, and electrodes of the piezoelectric elements 92 are electrically connected to the piezoelectric-side terminals 72 via the electrically conductive bonding agent 41.

Furthermore, as shown by the phantom lines in FIG. 1, the external board 96 is disposed in the external connecting portion 3 in the suspension board with circuit 1, and a terminal of the external board 96 is electrically connected to the external terminals 73.

The power source 99 is disposed in the external connecting portion 3 in the suspension board with circuit 1, and a terminal of the power source 99 is electrically connected to the power source terminals 42.

As shown in FIG. 5, in the suspension board with circuit 1, the thickness T1 of the pedestal portion 55 is thicker than the thickness T2 of the dam portion 56. Thus, when the slider 91 is brought into contact with the pedestal portion 55 in the slider mounting region 25, contact of the slider 91 with the dam portion 56 can be prevented, thereby preventing damage of the dam portion 56.

Meanwhile, the outflow of the adhesive 22 (ref: FIG. 7G) out of the slider mounting region 25 can be prevented by the dam portion 56, and the slider 91 can be surely fixed to the slider mounting region 25 by the adhesive 22.

To be specific, as referred to FIG. 4, the outflow of the adhesive 22 (ref: FIG. 7G) over the dam portion 56 into the rear side of the dam portion 56 and both outer sides in the right-left direction thereof can be prevented.

In the suspension board with circuit 1, the minimum size in a direction orthogonal to the thickness direction of the front-side pedestal conductive layer 46 and the grounding portion 75 (pedestal conductive layers) is larger than that in a direction orthogonal to the thickness direction of the dam conductive layer 49. To be specific, as shown in FIG. 5, the width W3 of the front-side pedestal conductive layer 46 and the diameter W2 of the grounding portion 75 (rear-side pedestal conductive layer) are larger than the width W1 of the dam conductive layer 49 (signal wire 43).

Thus, as shown in FIG. 5, the flat portion 84 is not formed in the dam first cover insulating layer 86, while the flat portion 84 is formed in the pedestal first cover insulating layer 85.

As a result, the thickness of the pedestal first cover insulating layer 85 can be formed to be thicker than that of the dam first cover insulating layer 86. To be specific, the length T3 from the upper surface of the front-side pedestal conductive layer 46 in the pedestal first cover insulating layer 85 to the upper surface of the pedestal first cover insulating layer 85 can be formed to be longer than the length T4 from the upper surface of the dam conductive layer 49 in the dam first cover insulating layer 86 to the upper surface of the dam first cover insulating layer 86.

Thus, the thickness T1 of the pedestal portion 55 can be surely formed to be thicker than the thickness T2 of the dam portion 56.

In the suspension board with circuit 1, the minimum size of the dam conductive layer 49, to be specific, the width W1, is the same as that in a direction orthogonal to the thickness direction of the wire 74, to be specific, the width W1. Thus, the thickness of the dam first cover insulating layer 86 covering the dam conductive layer 49 that includes the wire 74 can be surely formed to be thinner than that of the pedestal first cover insulating layer 85 covering the front-side pedestal conductive layer 46 and the grounding portion 75 (pedestal conductive layers). Thus, contact of the slider 91 supported by the pedestal portion 55 having the thickness T1 thicker than the thickness T2 of the dam portion 56 with the dam portion 56 can be surely prevented.

The minimum size of the signal wire 43 is the same size as the width W1 of the wire 74, so that the conductive layer 7 can be easily designed.

In the suspension board with circuit 1, the dam conductive layer 49 is the wire 74, so that damage of the wire 74 in the dam portion 56 having a thickness thinner than that of the pedestal portion 55 is prevented, and connection reliability of the wire 74 can be improved.

In the above-described one embodiment, the pedestal portion 55 includes the front-side pedestal base insulating layer 94 and the rear-side pedestal base insulating layer 95 (pedestal base insulating layers); the front-side pedestal conductive layer 46 and the grounding portion 75 (pedestal conductive layers); the pedestal first cover insulating layer 85 that covers the upper surfaces of the front-side pedestal conductive layer 46 and the grounding portion 75; and the front-side pedestal second cover insulating layer 38 and the rear-side pedestal second cover insulating layer 39 (pedestal second cover insulating layer 36) that are disposed on the upper surface of the pedestal first cover insulating layer 85. However, the layer structure of the pedestal portion 55 is not limited to the above-described description. Alternatively, for example, though not shown, the pedestal portion 55 can also include the front-side pedestal conductive layer 46 and the grounding portion 75 (pedestal conductive layers); the pedestal first cover insulating layer 85; and the front-side pedestal second cover insulating layer 38 and the rear-side pedestal second cover insulating layer 39 (pedestal second cover insulating layer 36) without including the front-side pedestal base insulating layer 94 and the rear-side pedestal base insulating layer 95 (pedestal base insulating layers).

In the above-described one embodiment, the dam portion 56 includes the dam base insulating layer 48, the dam conductive layer 49, the dam first cover insulating layer 86, and the dam second cover insulating layer 37. However, the layer structure of the dam portion 56 is not limited to the above-described description. Alternatively, for example, though not shown, the dam portion 56 can also include the dam conductive layer 49, the dam first cover insulating layer 86, and the dam second cover insulating layer 37 without including the dam base insulating layer 48.

In the above-described one embodiment, one example of the minimum size in a direction orthogonal to the thickness direction of the dam conductive layer 49 is defined as the width W1 of the wire 74. Alternatively, for example, though not shown, the dam conductive layer 49 can be also set to be wider than the width W1 of the wire 74 around the dam conductive layer 49 and narrower (smaller) than the width W3 of the front-side pedestal conductive layer 46 and the diameter W2 of the grounding portion 75.

In the above-described one embodiment, the dam conductive layer 49 is formed of the wire 74. Alternatively, for example, the dam conductive layer 49 can be also formed of a conductor member other than the wire 74.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A suspension board with circuit comprising:
a slider mounting region where a slider is to be mounted,
a pedestal portion provided in the slider mounting region and configured to support the slider, and
a dam portion provided in the slider mounting region and configured to prevent an adhesive for fixing the slider from flowing out of the slider mounting region, wherein
the thickness of the pedestal portion is thicker than that of the dam portion in a thickness direction which is orthogonal to a longitudinal direction and a width direction of the suspension board with circuit, where the longitudinal direction of the suspension board with circuit is defined as a front-rear direction along an elongated length of the suspension board with circuit, and the width direction is perpendicular to the longitudinal direction in a common plane therewith.

2. A suspension board with circuit comprising:
a slider mounting region where a slider is to be mounted,
a pedestal portion provided in the slider mounting region and configured to support the slider, and
a dam portion provided in the slider mounting region and configured to prevent an adhesive for fixing the slider from flowing out of the slider mounting region, wherein
the thickness of the pedestal portion is thicker than that of the dam portion, further comprising:
a conductive layer,
a first cover insulating layer covering one surface in a thickness direction of the conductive layer, and
a second cover insulating layer disposed at one surface in the thickness direction of the first cover insulating layer, and
the pedestal portion includes
a pedestal conductive layer included in the conductive layer,
a pedestal first cover insulating layer included in the first cover insulating layer and covering one surface in the thickness direction of the pedestal conductive layer, and
a pedestal second cover insulating layer included in the second cover insulating layer and disposed at one surface in the thickness direction of the pedestal first cover insulating layer;
the dam portion includes
a dam conductive layer included in the conductive layer,
a dam first cover insulating layer included in the first cover insulating layer and covering one surface in the thickness direction of the dam conductive layer, and
a dam second cover insulating layer included in the second cover insulating layer and disposed at one surface in the thickness direction of the dam first cover insulating layer; and
the minimum size in a direction orthogonal to the thickness direction of the pedestal conductive layer is larger than that in a direction orthogonal to the thickness direction of the dam conductive layer.

3. The suspension board with circuit according to claim 2, wherein
the conductive layer includes a wire and
the minimum size of the dam conductive layer is the same as that in a direction orthogonal to the thickness direction of the wire.

4. The suspension board with circuit according to claim 3, wherein
the dam conductive layer is the wire.

* * * * *